Dec. 7, 1948.   E. R. EVANS   2,455,572
GRAIN BLENDER
Filed July 8, 1948   2 Sheets-Sheet 1
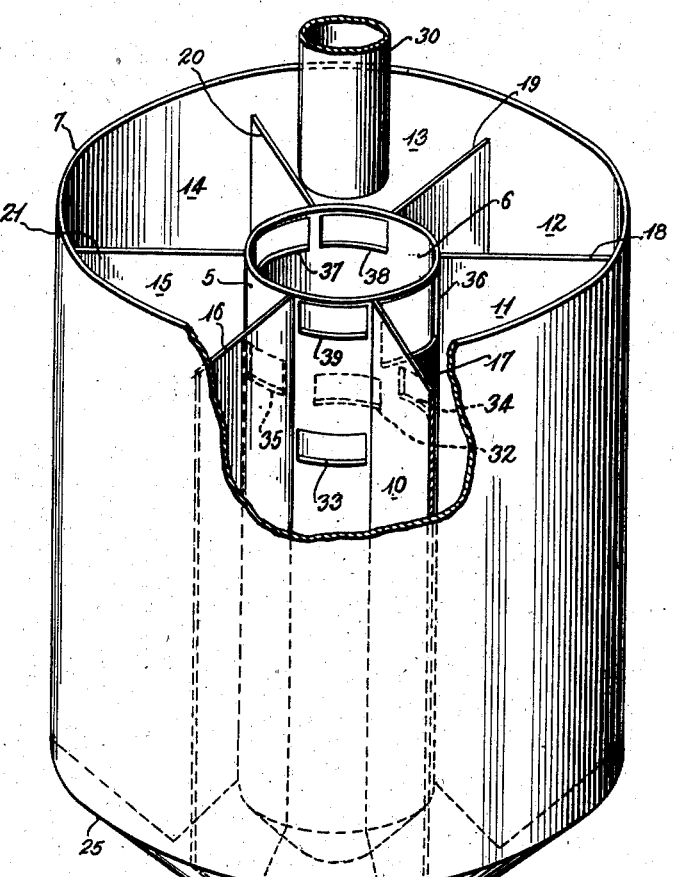
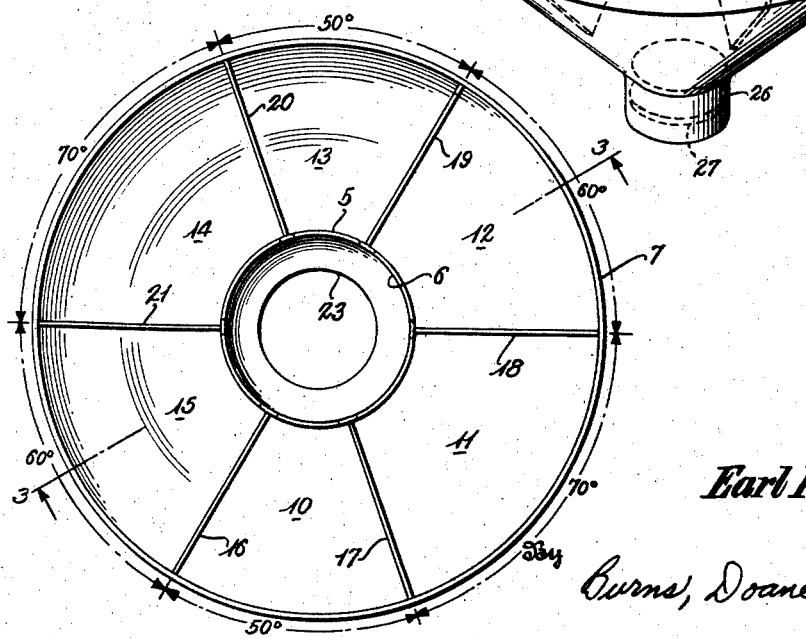
Inventor
*Earl R. Evans*
By *Burns, Doane & Benedict*
Attorneys Dec. 7, 1948.   E. R. EVANS   2,455,572
GRAIN BLENDER
Filed July 8, 1948   2 Sheets-Sheet 2
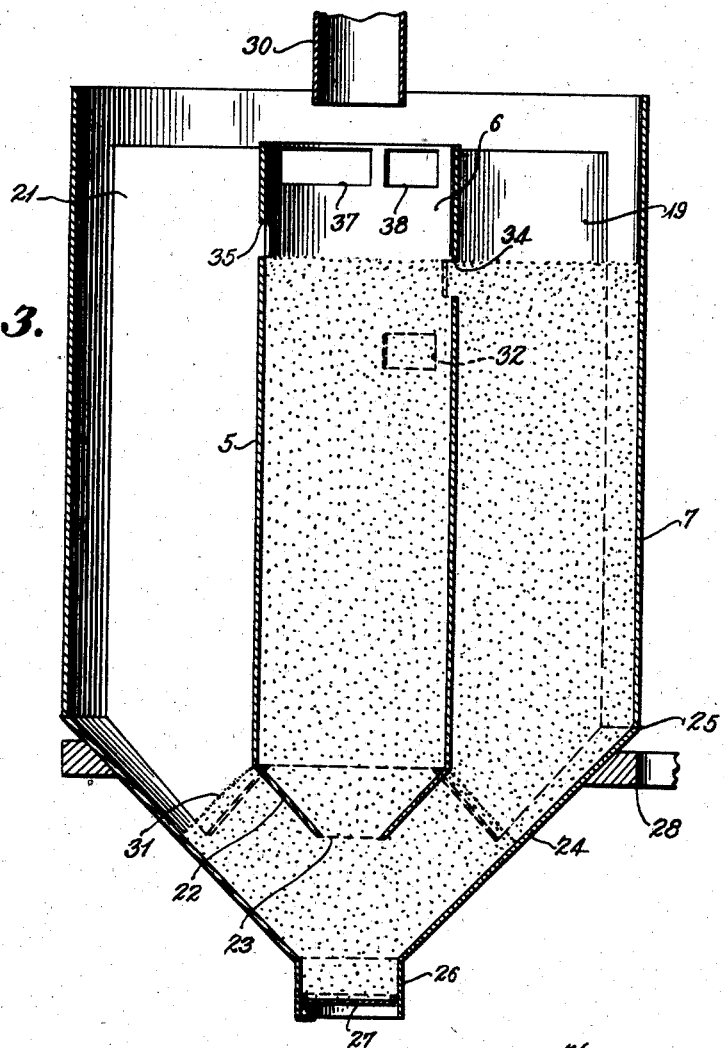
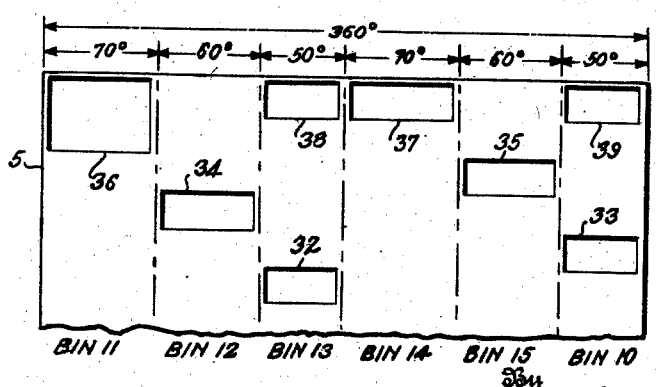
Inventor
*Earl R. Evans*
By
*Burns, Doane & Benedict*
Attorneys

Patented Dec. 7, 1948

2,455,572

UNITED STATES PATENT OFFICE 2,455,572

GRAIN BLENDER

Earl R. Evans, Urbana, Ill.

Application July 8, 1948, Serial No. 37,591

7 Claims. (Cl. 259—180)

This invention relates to a blending device for fluent materials. The invention is more particularly concerned with a device for blending dry materials such as grains and seeds which are capable of flowing under the forces of gravity.

Grains, beans and other agricultural products as well as other dry fluent materials are commonly received at a central receiving station from a plurality of producers or sources. The character of the agricultural products or other fluent materials may vary widely in factors which determine the commercial grade or utility of the products. Wheat serves as an excellent example of the type of fluent material with which this invention finds utility. There are several factors which are used in testing wheat to determine its relative value. These factors include weight per bushel of grain, moisture content, protein content, the pecentage of broken grains, the amount of smutty grain and the amount of chaff mixed with the wheat. The wheat is customarily graded as received according to the above or other factors. It is not practical however to store or ship each original lot separately and to thereby retain its exact original quality during storage or shipment. It is the usual practice to combine several lots or original receipts into one or more larger lots in storage bins or in transportation vehicles. The original lots may not be entirely uniform within themselves and particularly after original lots are mingled or mixed, it is found that the wheat in the combined lot being sent to storage or transportation lacks uniformilty and is of uneven quality from place to place within the lot. For example, a particular lot of wheat may contain "spots" of wheat which is of considerably poorer or considerably better quality than the average quality of the entire lot. The lot may also contain a "spot" in which the wheat has a moisture content much greater than the average moisture content of the entire lot and this concentration of moisture adversely affects the keeping qualities of the grain. It will be obvious that if a lot of grain is tested at one of the "spots" which is not characteristic of the average quality of the grain in the lot, the results of the test will be inaccurate and the entire lot of wheat will be graded too low or too high to the disadvantage of either the seller or the buyer.

My invention provides a device for blending a volume of grain or other fluent materials of varying character to obtain substantial uniformity throughout the volume of grain or other material. The grain may be tested after blending and the test will give a substantially true indication of the character or quality of the entire volume. The keeping qualities of grain are also improved by eliminating "spots" having excessive moisture content or other factors which adversely affect those keeping qualities.

A primary object of the invention is to provide a device for blending grains and other agricultural products or other fluent materials to obtain a maximum of uniformity in the blended material. A further object of my invention is to provide a device for the purpose indicated which requires no power for its operation and which has no moving mechanical parts except the control for the discharge outlet.

Further objects and advantages of the invention will be referred to in the following detailed description which has reference to the accompanying drawings wherein:

Figure 1 is a perspective view of a blending device constructed in accordance with the present invention, a portion of the device being shown broken away;

Figure 2 is a top plan view of the device;

Figure 3 is a sectional view looking in the direction of the arrows along the line 3—3 of Figure 2; and Figure 4 is a development in a plane of the upper portion of the wall of the central receiving compartment of the device.

The walls 5 form a tubular receiving compartment 6 which is disposed centrally of the device. An outer cylindrical shell 7 surrounds the receiving compartment 6. The annular space between the receiving compartment 6 and the outer shell 7 is subdivided into a plurality of bins by means of partitions. The partitions extend radially from the outer surface of the walls 5 of the receiving compartment 6 but the angles between adjacent partitions are not uniform.

For convenience the bins are designated by the reference numerals 10, 11, 12, 13, 14 and 15. The partitions 16 and 17 form an angle of 50 degrees with each other and define the sides of the bin 10. The bin 11 has its sides defined by the partitions 17 and 18 which form an angle of 70 degrees with each other. The partitions 18 and 19 which form an angle of 60 degrees with each other form the sides of the bin 12 while the partitions 19 and 20 form an angle of 50 degrees with each other and form the sides of the bin 13. The bin 14 has its sides formed by partitions 20 and 21 and the angle between those partitions is 70 degrees. The bin 15 lies between the partitions 16 and 21 which form an angle of 60 degrees with each other. The significance of the differential in the size of the various bins is explained hereinafter.

The walls 5 of the receiving compartment 6 taper inwardly at 22 (see Fig. 3) to define an opening 23 at the bottom of the receiving compartment. A frusto-conical hopper 24 has its upper rim welded or otherwise secured to the lower edge of the shell 7 as indicated by the reference numeral 25. The hopper 24 terminates in a discharge outlet 26 provided with any suitable discharge control means such as a gate 27. The partitions 16 to 21 inclusive extend below the lower edge of the shell 7 as well as below the cylindrical portion of the receiving compartment 6 and terminate in the interior of the hopper 24. This arrangement is best illustarted in Figure 3 of the drawings.

The device may be supported by any suitable means such as the bracket 28 of a weighing mechanism, not shown. The material of varying character which is to be blended may be supplied to the receiving compartment 6 by means of an outlet 30 of an elevator or garner.

The grain or other material being discharged through the elevator or garner outlet 30 will initially fall through the receiving compartment 6, through the opening 23 and into the lower portion of the hopper 24. The material will accumulate in the bottom of the hopper 24 until it reaches a certain level depending somewhat upon the character of the material. The reference numeral 31 designates an exemplary level to which the material may rise in hopper 24 before flow through the opening 23 ceases and the grain begins to accumulate within the receiving compartment 6.

There are openings in the walls 5 of the receiving compartment 6 which communicate with each of the bins 10 to 15 inclusive. These openings are at different elevations so that one of the bins begins to fill first and the filling of the other bins begins successively one by one. The material will rise in the receiving compartment 6 until it reaches the elevation of opening 32 which communicates with the bin 13. The bin 13 then begins to fill through the opening 32. As soon as bin 13 fills to the level of opening 32, the material being fed to the receiving compartment 6 will again rise until the material reaches the elevation of the opening 33 whereupon the material will discharge through that opening into the bin 10. It will be noticed that bins 10 and 13 are diametrically opposite each other. Since these are the first two bins to fill, it will be apparent that the device does not become greatly unbalanced as would be the case if adjacent bins were among the first to be filled. The upper level of the material in the receiving compartment 6 continues to rise until it reaches the elevation of the opening 34 which communicates with the bin 12 and the bin 12 begins to fill. When the material again rises in the compartment 6 the upper level reaches the elevation of the opening 35 which communicates with the bin 15. The bin 15 begins filling at this time and since it is diametrically opposite the bin 12 the substantial balance of the device is maintained.

The upper level of the material in the compartment 6 continues to rise until it reaches the elevation of the opening 36 which communicates with the bin 11 and that bin begins filling. The bin 14 is the last to begin filling and this occurs when the upper level of the material in the compartment 6 reaches the elevation of the opening 37. The bins 11 and 14 are diametrically opposite each other and since these are the last two bins to begin filling the substantial balance of the device is maintained.

There is an additional opening 38 near the upper end of the compartment 6 which communicates with the bin 13 and there is a similarly positioned opening 39 which communicates with the bin 10. Additional material may thus be discharged into these two bins in the event that they have not already been filled to the elevation of the opening 38 and 39. It will be seen that the upper end of the receiving compartment 6 is positioned somewhat below the upper end of the shell 7 so that some additional material may be permitted to overflow the upper edges of the receiving compartment 6 and this overflowing material will round out the bins surrounding the compartment.

The weight of material within the device may be ascertained by means of scales to which the bracket 28 may be attached or of which the device may be an integral part. The gate 27 is then opened and the material will discharge by gravity through the discharge outlet 26. The material within the receiving compartment 6 and the material within the surrounding bins will discharge simultaneously and the material from these several sources will become intimately mixed and blended so that the material issuing from the discharge outlet 26 will be substantially uniform in character. The blending appears to be primarily due to the fact that the bins have been filled during different intervals of time coupled with the fact that these bins are discharged simultaneously into the hopper 24 where they combine to form a single discharge stream.

It has been explained above that the bins 10 and 13 each occupy 50 degrees of the circumference of the device. These two bins are thus smaller than the other bins and since they are the first to fill it is possible to fill these bins with less bulk than would be the case if the bins were larger and therefore any given amount of grain or other material will fill more compartments than would be possible if all of the bins were of equal size. By this arrangement it is possible to obtain a greater number of subdivisions from a quantity of material less than the full capacity of the device. A greater number of subdivisions of any given quantity of material contributes to greater uniformity of the resulting blend. It is satisfactory in some instances to make the bins of uniform size.

I have illustrated and described what I now consider to be the preferred form of my invention. However it will be understood that the device which I have specifically illustrated and described is exemplary only and that various modifications may be resorted to without departing from the invention in its broader aspects as defined by the following claims.

Having thus described my invention I claim:

1. A blending device for fluent material comprising a compartment for receiving fluent material of varying character, a plurality of bins positioned around and adjacent said receiving compartment, said compartment and said bins being open at their lower ends, a downwardly tapered hopper positioned beneath said receiving compartment and said bins and forming a closure for the lower end of said device, there being openings at different elevations in the wall of said compartment communicating with different of said bins to permit fluent material in said compartment to discharge into different bins as the level of such material rises in said compartment, the arrangement of said openings being such that all of said bins do not receive material simultaneously from said compartment through said openings, a discharge outlet in the lower end of said hopper, and means for controlling discharge through said outlet.

2. A blender for fluent materials comprising a compartment for receiving fluent material of varying character, a plurality of bins positioned adjacent said receiving compartment and communicating with said receiving compartment through openings in the walls thereof, said openings being positioned at different elevations to cause the different bins to receive fluent material from said receiving compartment at different times in accordance with the height of fluent material accumulated in said receiving compartment, the arrangement of said openings being such that all of said bins do not receive material simultaneously from said compartment through said openings, said receiving compartment and said adjacent bins all communicating at their lower ends with a blending hopper having a discharge outlet, and means for controlling the discharge of fluent material from said outlet.

3. A blending device for fluent materials comprising compartment walls forming a compartment for receiving fluent material of varying character, shell walls spaced outwardly from said compartment walls and forming an outer shell, partitions extending from said compartment walls to said shell walls and dividing the space therebetween into a plurality of bins, there being openings at different elevations in the wall of said compartment communicating with different of said bins to permit fluent material in said compartment to discharge into different bins as the level of such material rises in said compartment, the arrangement of said openings being such that all of said bins do not receive material simultaneously from said compartment through said openings, a hopper positioned beneath said compartment and said bins and forming a closure for the lower end of said device, a discharge outlet in the lower end of said hopper, and means for controlling discharge through said outlet.

4. A blending device as described in claim 3 in which said partitions extend below the lower edge of the walls of said shell and terminate in said hopper.

5. A blending device for fluent materials comprising compartment walls forming a central fluent material receiving compartment which tapers at its lower end, shell walls forming a shell surrounding said compartment, partitions extending from said compartment walls to said shell walls dividing the space therebetween into a plurality of bins, there being openings at different elevations in the wall of said compartment communicating with different of said bins to permit fluent material in said compartment to discharge into different bins as the level of such material rises in said compartment, the arrangement of said openings being such that all of said bins do not receive material simultaneously from said compartment through said openings, a downwardly tapering hopper secured to the lower edge of said shell, said partitions and the tapered lower end of said compartment extending into said hopper, a discharge outlet in the lower end of said hopper, and control means for controlling discharge of fluent material from said outlet.

6. A blending device for fluent material comprising a vertically disposed central tubular member forming a compartment for receiving fluent material of varying character, a vertically disposed tubular shell surrounding said tubular member and being of substantially greater diameter than said tubular member, partitions radiating from said tubular member to said tubular shell dividing the annular space therebetween into a plurality of bins, there being openings at different elevations in the wall of said tubular member communicating with different of said bins to permit fluent material in said compartment to discharge into different bins as the level of such material rises in said compartment, the arrangement of said openings being such that all of said bins do not receive material simultaneously from said compartment through said openings, a downwardly tapering hopper having its upper edge secured to the lower edge of said tubular shell, a discharge outlet in the lower end of said hopper, and means for controlling discharge through said outlet.

7. A blending device as described in claim 6 in which said partitions extend below the lower edge of said tubular shell into said hopper.

EARL R. EVANS.

REFERENCES CITED

The following references are of record in the file of this patent:

UNITED STATES PATENTS

| Number | Name | Date |
| --- | --- | --- |
| 1,145,215 | Roney | July 6, 1915 |

FOREIGN PATENTS

| Number | Country | Date |
| --- | --- | --- |
| 29,575 | Australia | Oct. 15, 1930 |